United States Patent [19]

Szmanda et al.

[11] Patent Number: 5,067,834
[45] Date of Patent: Nov. 26, 1991

[54] INPUT KEYBOARD APPARATUS FOR INFORMATION PROCESSING DEVICE AND OTHER KEYBOARD DEVICES

[76] Inventors: Jeffrey P. Szmanda, 728 W. St. Paul Ave., Waukesha, Wis. 53188; William J. Szmanda, N61 W15150 Wigwam Dr., Menomonee Falls, Wis. 53051

[21] Appl. No.: 376,690

[22] Filed: Jul. 7, 1989

[51] Int. Cl.⁵ .............................................. B41J 5/10
[52] U.S. Cl. ...................................... 400/489; 400/82; 400/472
[58] Field of Search ................. 400/82, 472, 473, 488, 400/489, 492; 340/711, 712

[56] References Cited

U.S. PATENT DOCUMENTS

| | | | |
|---|---|---|---|
| 3,990,565 | 11/1976 | Felton et al. | 400/83 |
| 4,378,553 | 3/1983 | McCall | 340/365 R |
| 4,402,624 | 9/1983 | Stahl et al. | 400/681 |
| 4,597,681 | 7/1986 | Hodges | 400/488 |
| 4,661,005 | 4/1987 | Lahr | 400/489 |

OTHER PUBLICATIONS

Article entitled "Multifinger Tapping Performance as a Function of the Direction of Tapping Movements" by Lyle R. Creamer and Don A. Trumbo.
Article entitled: "Keyboard Design and Operation: A Review of the Major Issues" by D. G. Alden, R. W. Daniels and A. F. Kanarick.

Primary Examiner—Clifford D. Crowder
Assistant Examiner—Ren Yan
Attorney, Agent, or Firm—Andrus, Sceales, Starke & Sawall

[57] ABSTRACT

An input keyboard unit includes a left and right keyboard. A separate universal pivot support unit is secured one to each keyboard and to a base support plate. Each universal pivot unit includes a telescopic shaft with a releasable connector for holding of the shaft in desired extended position. One end of the shaft or post unit is secured to the keyboard through a mounting plate. A ball and socket unit is secured to the opposite end and through a tongue and groove connection to a base plate for lateral positioning of the pivot units and the attached keyboard relative to each other. The ball and socket unit allows universal pivoting of the keyboard about the mounting to the base plate and thereby permits the optimal positioning of the keyboard with respect to the hands of the operator. In one embodiment, the two separate keyboard boards are generally rectangular members. A universal pivot units interconnects the top inner corners of the two keyboards whereby a generally inverted V-shaped spacing is provided between the two keyboards with each keyboard having a front-to-back inclination and a lateral side inclination with the universal pivot units of the keyboards permitting the precise optimal setting for any given individual or group of individuals. The keyboard connecting pivot unit is releasable to allow lateral spacing of the keyboards where desired or necessary for any given individual.

13 Claims, 6 Drawing Sheets

INPUT KEYBOARD APPARATUS FOR INFORMATION PROCESSING DEVICE AND OTHER KEYBOARD DEVICES

BACKGROUND OF THE PRESENT INVENTION

Input keyboards are used to input information into information processing and translating devices such as computers, typewriters, calculators and the like. The keyboard units have uniformly included support with the various input and control keys distributed in an appropriate planar array to present a convenient planar presentation of the individual keys. The keys for computers have been located within a standard cartesian matrix or format of column and rows of individual letters and numbers for many years, with the numbers arranged above the letters. The various interrelated control element keys are generally located in the cartesian matrix to the sides of the letter and number keys. Other devices such as calculators may have only numbers and mathematical function keys arranged in rows and columns.

With the great increase in the number and use of computers having input keyboards of the planar arrays, ergonomic considerations have become of great significance. The development of computing devices using standard type keyboards has particularly brought the user considerations into greater interest. Thus, schools are introducing children in third and fourth grades and earlier to calculators and computers, and teaching use application of such devices. Various game devices use computer-type keyboards and are used by children at very young ages. As students progress through school, the use of computers becomes greater and greater.

Interest in the ergonomic consideration has resulted in certain suggested variations in the standard keyboards.

A significant physical difficulty which with repetitive motion arises in connection with operators who operate at a keyboard over a long period of time, and particularly for long periods on any given day or successive days causes nerve damage known as carpal tunnel syndrome. The latter ailment is a disruptive and physically painful disorder in the operator's wrist as a result of the repetitive motion and orientation of the hands relative to the arm. The condition often requires medical attention and in severe cases can result in the incapacity of the operator for the normal work functions. In severe cases, the person may have to cease working resulting in workman compensation expenses or take a much lesser position with a loss of wages as well as significant medical expenditures. The cost in human suffering, lost time and medical costs associated with the problem is presently severe, and with the greater usage of computer keyboards by the ever increasing population, we can anticipate only create further and more severe problems.

U.S. Pat. No. 4,402,624 discloses a keyboard having an infinitely adjustable support for varying of the inclination or angle of the keyboard as present to the operator. As more fully discussed in the '624 patent, the inclination of the keyboard has been studied and an optimal angled support for an average operator determined with the keyboard generally so constructed. The fixed orientation is however optimal for those operators who conform to the average specification, and the '624 patent discloses an adjustable structure to permit individual adjustment for each operator. Studies relating to keyboard orientations have investigated the fore and aft inclination as well as possible lateral inclination. A literature compilation on the subject entitled "Keyboard Designs and Operation: A Review of the Major Issues" by Alden et al was published in the August 1972 issue of The Journal of the Human Factors Society with comments on a selected few prior publications. An article by a K. H. E. Kroemer is referenced wherein a special keyboard is disclosed with a modified key arrangement and orientation as well as a keyboard having spaced lateral inclined portions on which the special key assemblies are mounted. The Alden article list some 80 different publications pertinent to the general subject of the keyboard devices.

U.S. Pat. No. 4,378,553 discloses a keyboard formed into two separate parts which can be appropriately spaced and located for use by physically handicapped operators requiring minimal movement during actual inputting of data to the device.

The extensive literature indicates the general interest and concern which has been created in the field. However, the keyboard with the standard orientation and key arrangement is universally used throughout the field of information processing. A significant need exists for a feasible keyboard construction which can retain the present key arrangement, and particularly adapted for retrofitting of existing devices.

SUMMARY OF THE PRESENT INVENTION

The present invention is particularly directed to a keyboard apparatus having the keyboard rearranged to facilitate the use of the keyboard without the usual positioning and movement of the hands relative to arms and in a manner which avoids wrist tensions and complications, and thereby minimizing, if not essentially eliminating, the problem of wrist injury.

Generally, in accordance with the teaching of the this invention, the keyboard is formed with a pair of planar portions or sections having individual universal support units whereby the keyboard sections are adapted to be inclined in space from an intermediate portion of the keyboard to present a more or less inverted V-shaped keyboard assembly tailored to the particular user or operator. The keyboard is preferably formed with the apex at the center, with half the keys arranged to one section and the second half of the keys arranged on the second section of the keyboard. The keys and interrelated mechanism can be constructed in essentially the same manner as presently constructed, although any variation can of course be provided if desired. With the standard key presentation, the operator will operate the dual inclined keyboard essentially in the identical manner they now input the standard keyboard. However, the universal mount or support unit allows the positioning of the keyboard sections for optimal operator comfort and physical safety. The physical difference to the operator however is dramatic in that the hand project straight out from the arm without the necessity of significant angulation or twist, and particular change therein between the hand and the arm at the wrist portion.

In the preferred construction of the support unit, the post structure is extendible as by a telescopic construction. In addition, each base is releasably mounted to a support member permitting lateral spacing of the sections. Thus, each section can be oriented in space with optimal setting of the keyboard for different operators.

In a preferred embodiment of the invention, each of the universal supports is generally similarly constructed.

In a preferred construction, the support includes a telescoping cylinder unit having a fixed top mounting plate and a bottom universal ball joint connector. An internal locking mechanism permits the telescoping and locking of the shaft in any desired vertical orientation or axial projection. The telescoping cylinders allow the collapsing of the board relative to its support to form a compact keyboard assembly. The telescoped cylinders permit the location of the keyboard for optimum positioning of the operator. The ball joint is shown as a simple conventional ball joint assembly having a socket member with a socket ballmounted therein for universal mounting. The stub shaft on the ball is connected to the bottom end of the extenible shaft. The socket member includes a lower socket having a mounting block mating with a correspondingly shaped groove in a support base for lateral placement of the keyboards. A locking member releasably locks the unit in place. The operator can conveniently grasp the cylinder unit and pivot the keyboard in any direction for setting the optimal inclination of each keyboard.

A similar universal connector may also connect the top inner corners of the two keyboards to maintain a V-shaped board configuration. The board connector preferably has a separable construction to permit separation of the keyboards.

The pivot coupling of the upper end edge of the keyboard is advantageously provided for the average usage. It thus permits the very convenient orientation and positioning of the keyboard sections as well as the clamps thereof as a compact assembly. In some instances, where the separation of the keyboard sections may be advantageously significantly increased as by a complete separation of the two keyboard sections, the connector can be disconnected and the board separately located laterally of the typing station. In such instances, a connecting cable may be required to provide appropriate connection of the keyboard sections to each other and into the central processing unit.

The present invention may advantageously be applied to other types of devices including single keyboard devices such as calculators, control devices and the like where a very limited number of keys are provided and are normally one hand operated. In such a device, the keyboard is supported on the single universal support structure.

BRIEF DESCRIPTION OF THE DRAWING

The drawing furnished herewith illustrates the best modes presently comtemplated for carrying out the invention and are described hereinafter.

In the drawing.

DESCRIPTION OF THE ILLUSTRATED EMBODIMENT

Figure 1:
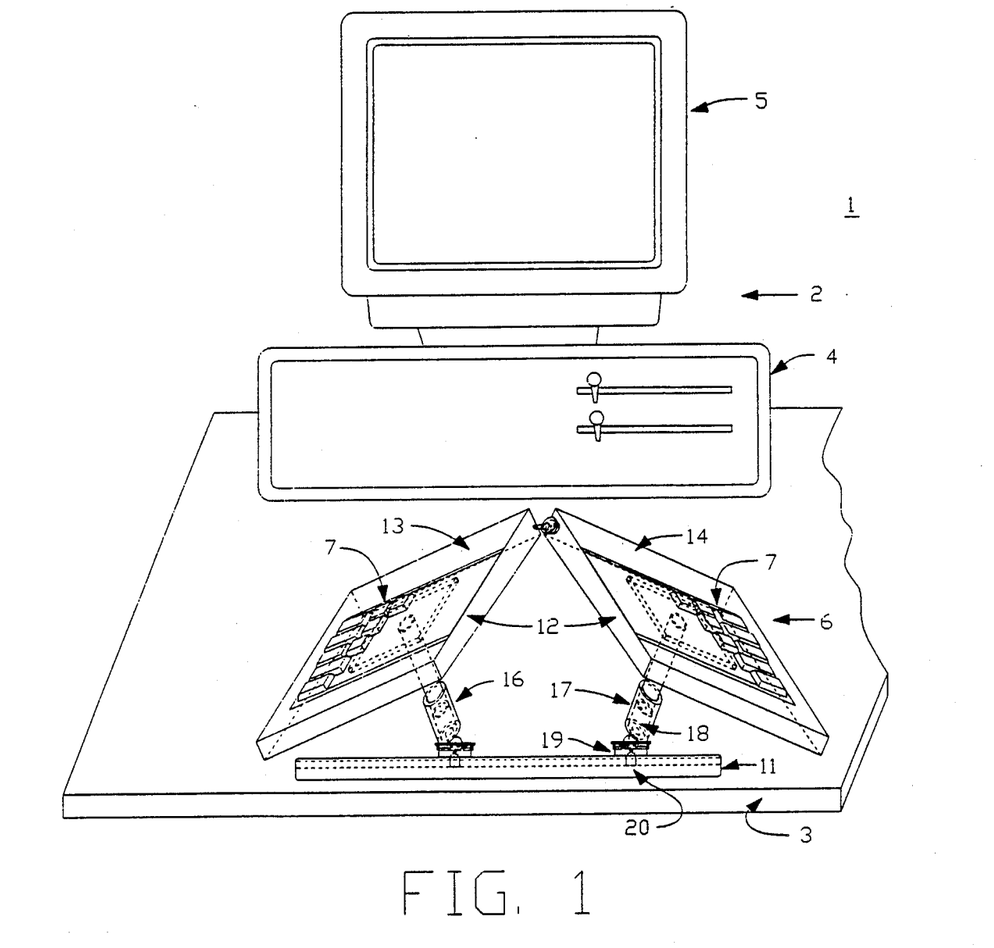
FIG. 1 is a front elevational view of a computer work station including a keyboard unit incorporating the teaching of the present invention.

Referring to the drawings and particularly to FIG. 1, a computer work station 1 is illustrated including a diagrammatically illustrated central processing unit 2 mounted on a work table 3 for convenient operation by an operator, not shown. In accordance with conventional practice, the computer 2 includes a central processing unit 4, shown having an outer housing resting on the table and containing the computer hardware, not shown, for receiving of appropriate software and the like. The internal detail of the computer is of course not shown as it may be of any suitable construction. A display unit or monitor 5 is mounted to the top of the computer 4 for displaying of information as inputted and processed by the computer and selectively outputted by the operator. An inputting keyboard 6 is either mounted to the front of the computer 4 in a convenient location for actuation by the operator or connected by a suitable cable, not shown, to computer unit 4. The keyboard 6 includes an array of the usual keys 7 including the alphabetic, numeric and control keys for inputting information to the computer as well as controlling the processes of the computer and outputting information to the monitor 5 and other output devices, not shown, such as a printer, remote transmission couplings and the like. The keys 7 are arranged in a known manner with the alphabetic and numeric keys in columns and rows in a cartesian array and with the control keys 7 similarly located to one or both sides thereof. Each key 7 and the internal electronics and actuation of the electronics by the key can be constructed in accordance with well known existing technology as well as any future technology. The present invention is particularly directed to the construction and configuration of the keyboard and its support for providing a most convenient and effective user designed apparatus. Consequently, the other elements of the computer apparatus are not further described other than as necessary to clearly describe the illustrated embodiment of the invention.

Figure 2:
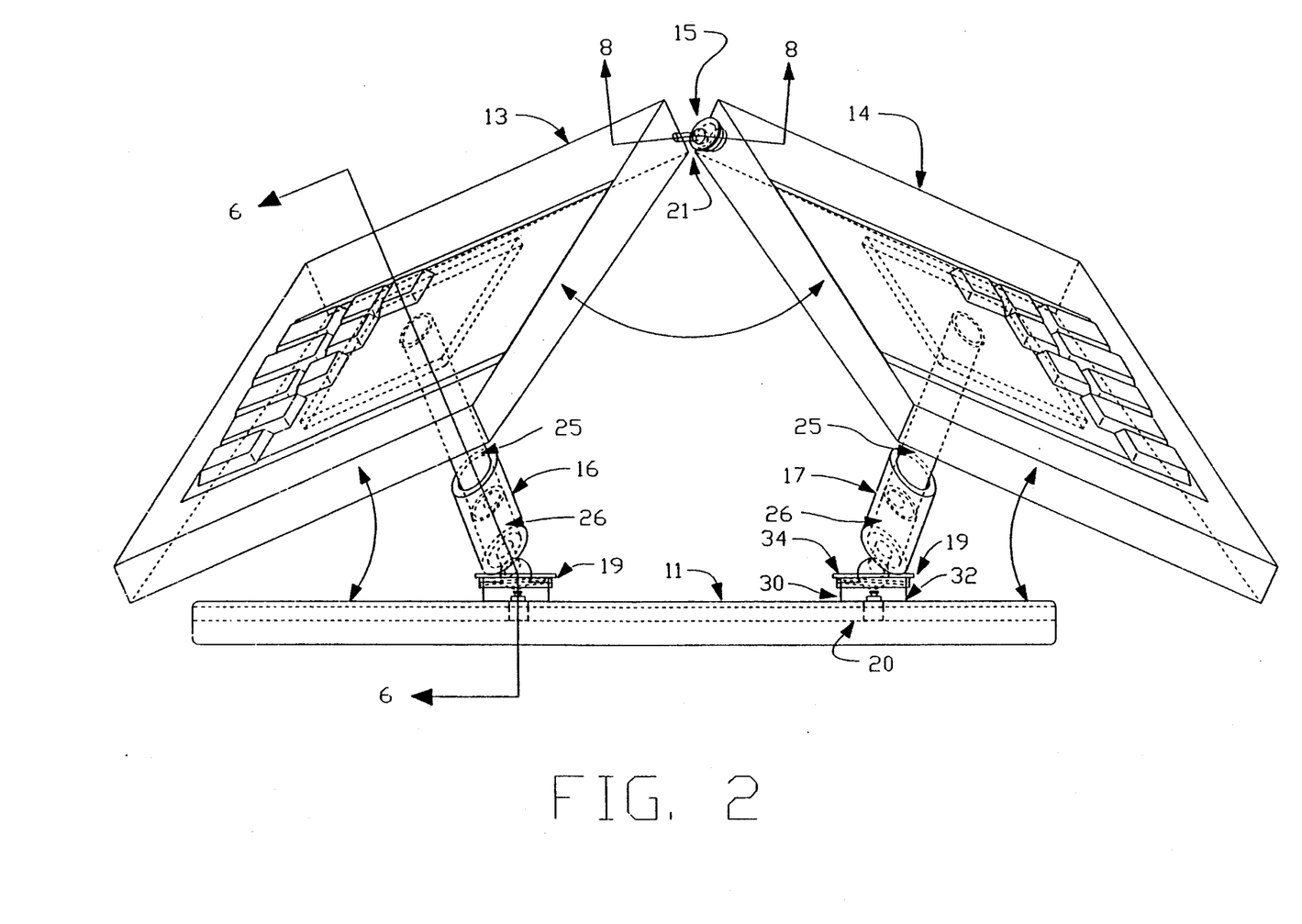
FIG. 2 is an enlarged front elevational view of the keyboard unit.
Figure 3:
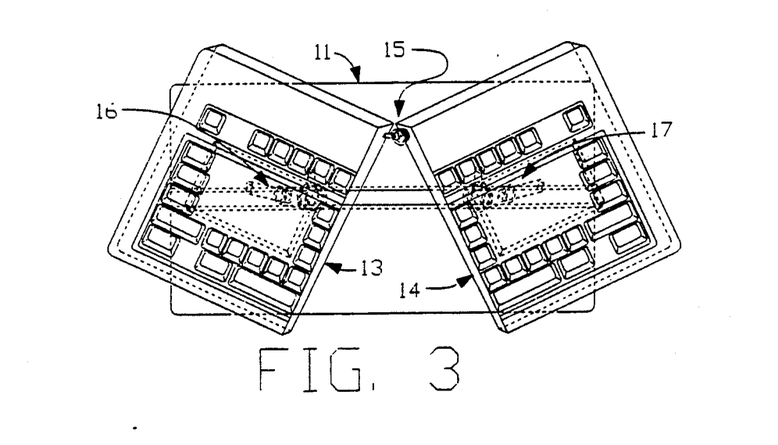
FIG. 3 is a plan view of FIG. 2.
Figure 4:
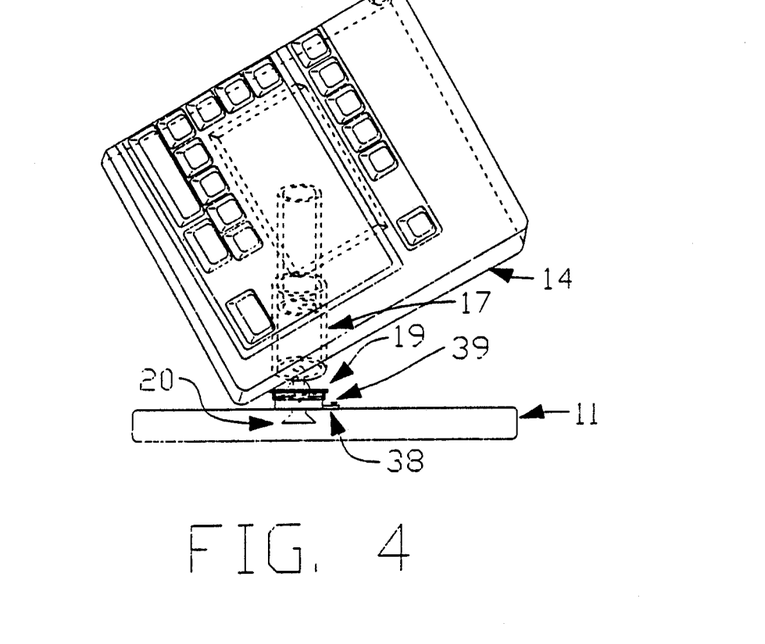
FIG. 4 is a side view of the keyboard shown in FIG. 1.

Referring particularly to FIGS. 1 through 3, inclusive, the illustrated keyboard unit 6 includes a supporting bottom wall 11 and an upper wall unit 12. The wall unit 12 includes opening for areas defining touch keys 7 in accordance with known constructions. The wall unit 12, in accordance with one embodiment of this invention, is generally an inverted V-shaped configuration defining a very distinct left keyboard section 13 and right keyboard section 14. The illustrated V-shaped wall unit 12 has the apex 15 located centrally of the keyboard such that each sections 13 and 14, consists of essentially one half of the keys 7 of the total keyboard. Each section 13 and 14 is, in accordance with the present invention, secured to the base or bottom wall by individual universal support units 16 and 17 respectively.

Figure 5:
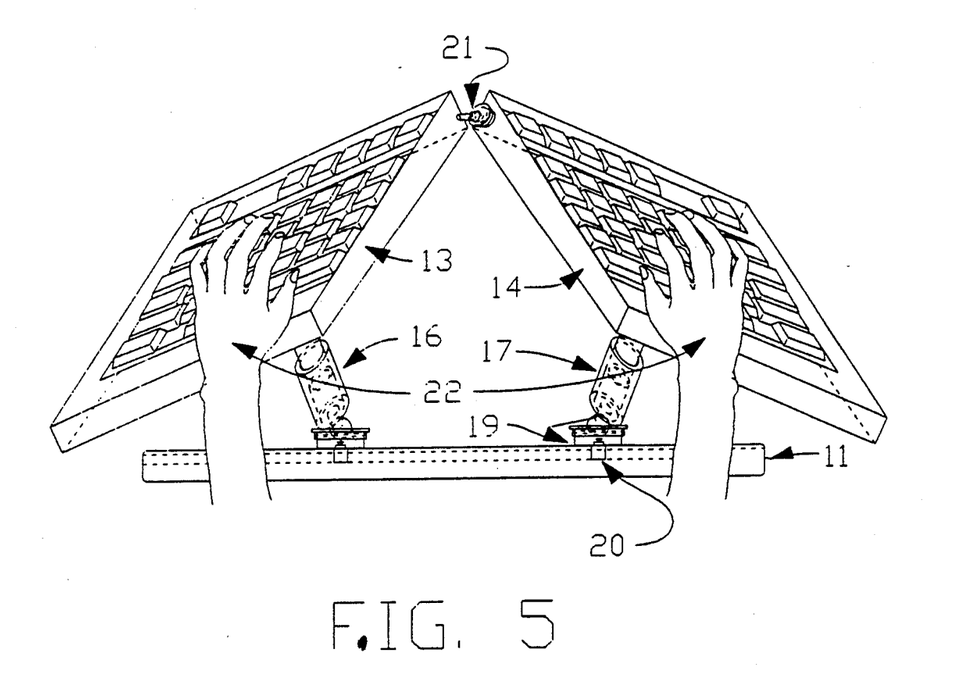
FIG. 5 is a view similar to FIG. 2 illustrating operator's hands on the keyboard unit.
Figures 6, 7, 8:
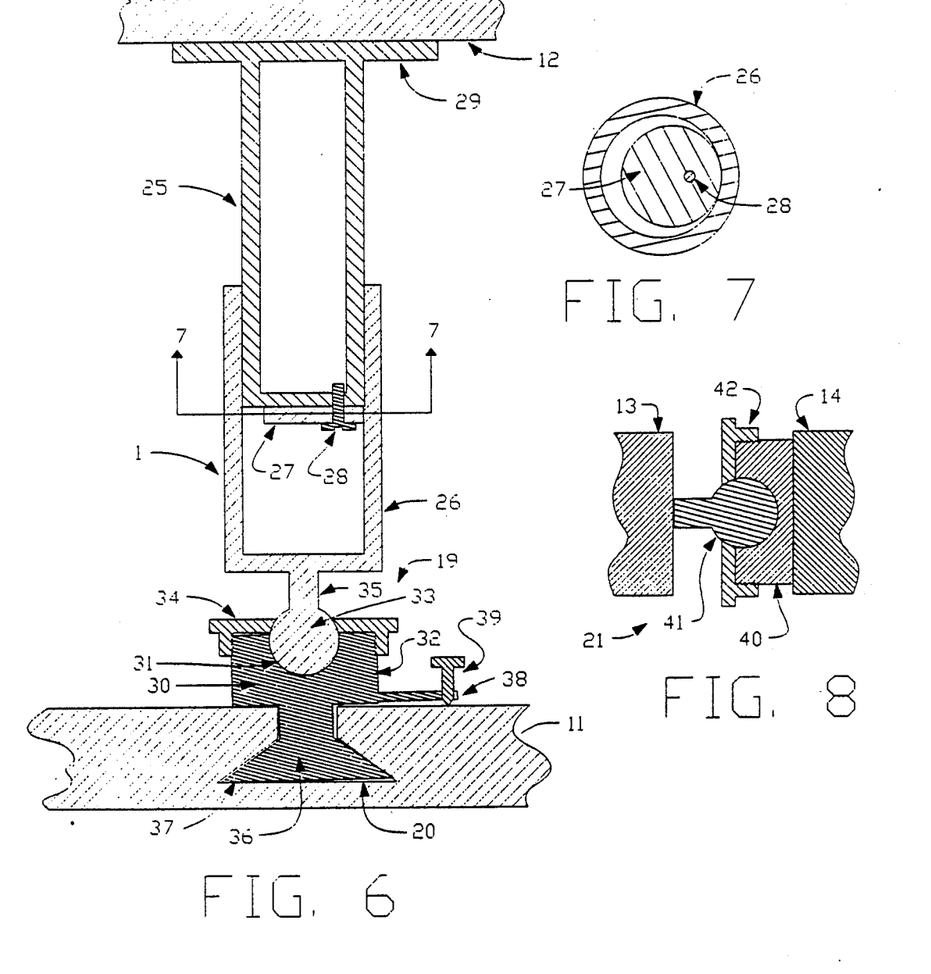
FIG. 6 is an axial sectional view of a universal support unit shown in FIGS. 1-5 and taken generally on line 6—6 of FIG. 2.
FIG. 7 is a sectional view taken generally on line 7—7 of FIG. 6.
FIG. 8 is an axial section through a universal pivot unit connecting the two sections and taken generally on line 8—8 of FIG. 2.

Support units 16 and 17 are identically constructed and with reference unit 17 as shown most clearly in FIGS. 6 and 7, generally include an extendible post structure 18 and a universal pivot device or unit 19. In addition, a sliding attachment unit 20 secures the post structure 18 to the bottom wall unit 11 for lateral placement relative to the other section. A pivot connector unit 21 joins the top inner edges of the sections at the apex 15. The keyboard sections 16 and 17 are therefore movable in space to establish optimal positioning for the operator hands 22 as diagramatically shown in FIG. 5.

The illustrated V-shaped configuration provides a lateral inclination in each of the left and right sections 13 and 14 of the keyboard, with a stepped array of the keys from the outer portion to the top or center apex 15, with the outermost key column at the lower level and with succeeding columns located in the inclination and plane of the tilted keyboard to the apex 15. The wall unit 12 may maintain the conventional front to back inclination generally in accordance with past practice. The front to back inclination thus presents the keys 7 in a stepped array, with the front or forward row of keys 17 at the lowest level and the rearward or back row of keys 18 at the highest level.

The illustrated array of the keys allows the operators hand 22 to project forward in an essentially straight line from the arm 22 and wrist 23. This is in distinct constrast to the conventional keyboard which requires the hands 19 to be in an offset relationship with respect to the arm in the normal operation of the keyboard, without moving of the total arm structure. The result is a significant reduction in the stress on the wrist structure of the operator and minimizing, if not completely eliminating, the strain and stress on the wrist and interconnecting muscular skeletal portions of the wrist, arm and hands. The operator will not only be physically more comfortable but one can anticipate the mental and emotional improvement to the operator as the result of the elimination of the physical damage, and the elimination of any anticipated ailment by the operator as a result of repetitive motion over long periods of work at computer or other information processing station. Additionally, one can anticipate that learning to activate the keys 7 will be easier and accuracy of the inputting will increase.

Figure 9:
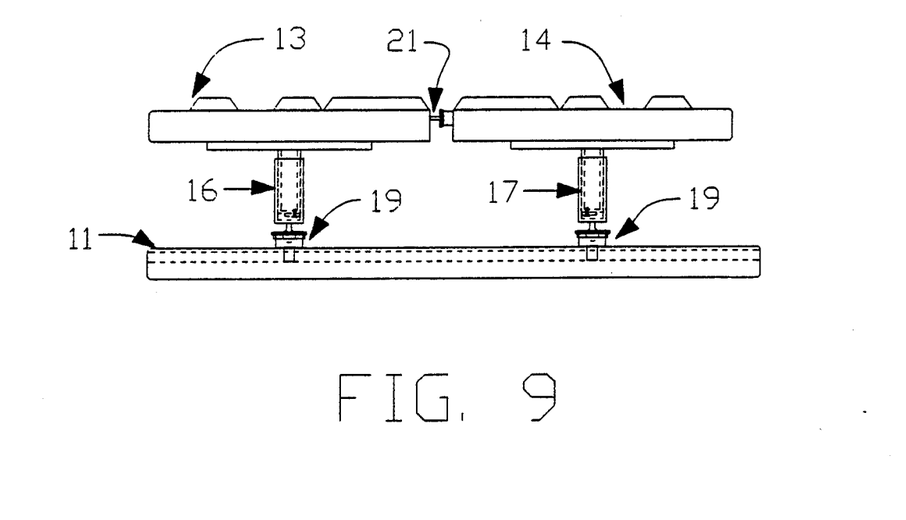
FIG. 9 is a front elevational view of the keyboard in a storage position.

More particularly and with reference to FIGS. 8 and 9, the post structure 18 is illustrated including telescopic cylinder members 25 and 26. A self locking disc member 27 is pivotal affixed by a pivot pin 28 to the inner end of member 25. The pivot pin 28 is located off center of members 25 and 26 such that relative rotation in one direction locks the members 25 and 26 in place, and opposite rotation releases the members for telescopic positioning. The outer end of the post structure 18 has a mount plate 29 secured to member 25. The lower end of the post structure has the universal pivot unit 19 for providing a universal positioning of the station.

The pivot unit 19 is a well known assembly including a cup-shaped pivot member 30 which has a semi-cylindrical socket 31 in a mounting base 32. A pivot ball 33 is secured with socket 31 by a cap-nut 34. A mounting shaft 35 projects from the ball 33 and is secured to the bottom end of the telescopic member 26 to permit universal pivoting of the attached array section.

Unit 20 includes a slide member 36 secured as a part of member 30 and slidably disposed in a groove 37 in the bottom wall unit 11. A lock tab 38 has a threaded bolt 39 which is threaded into abutting engagement with the bottom wall unit 11 to lock the array section in place.

The universal pivot unit 21 is shown a construction corresponding to the pivot unit 19 of the post structure 18. Thus, a cup-shaped socket 40 is secured to array section 14 and a ball 41 is secured to the array section 13. A threaded cap 42 on socket 40 releasably locks the ball 41 in place. Each of the pivot units includes suitable locking devices to lock the keyboards in preset positions tailored to an individual or group of individuals. The locking device can of course be provided with a coded key, not shown, or the like to restrict adjustment of the keyboard members to authorized personnel. If one operator is the only user of the keyboard, they may of course be provided with an appropriate key so that they can make such adjustments from time-to-time as appear necessary or desirable.

Figure 10:
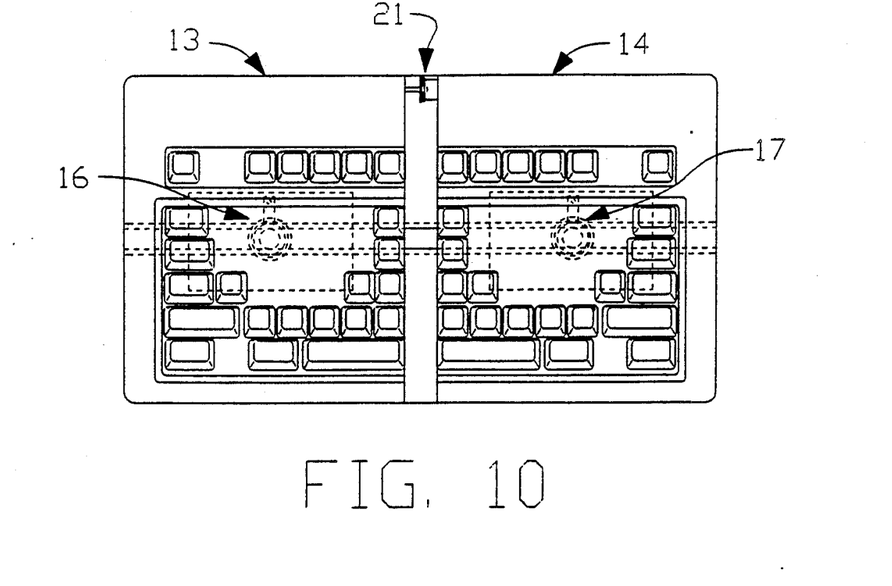
FIG. 10 is a plan view of FIG. 9.
Figure 11:
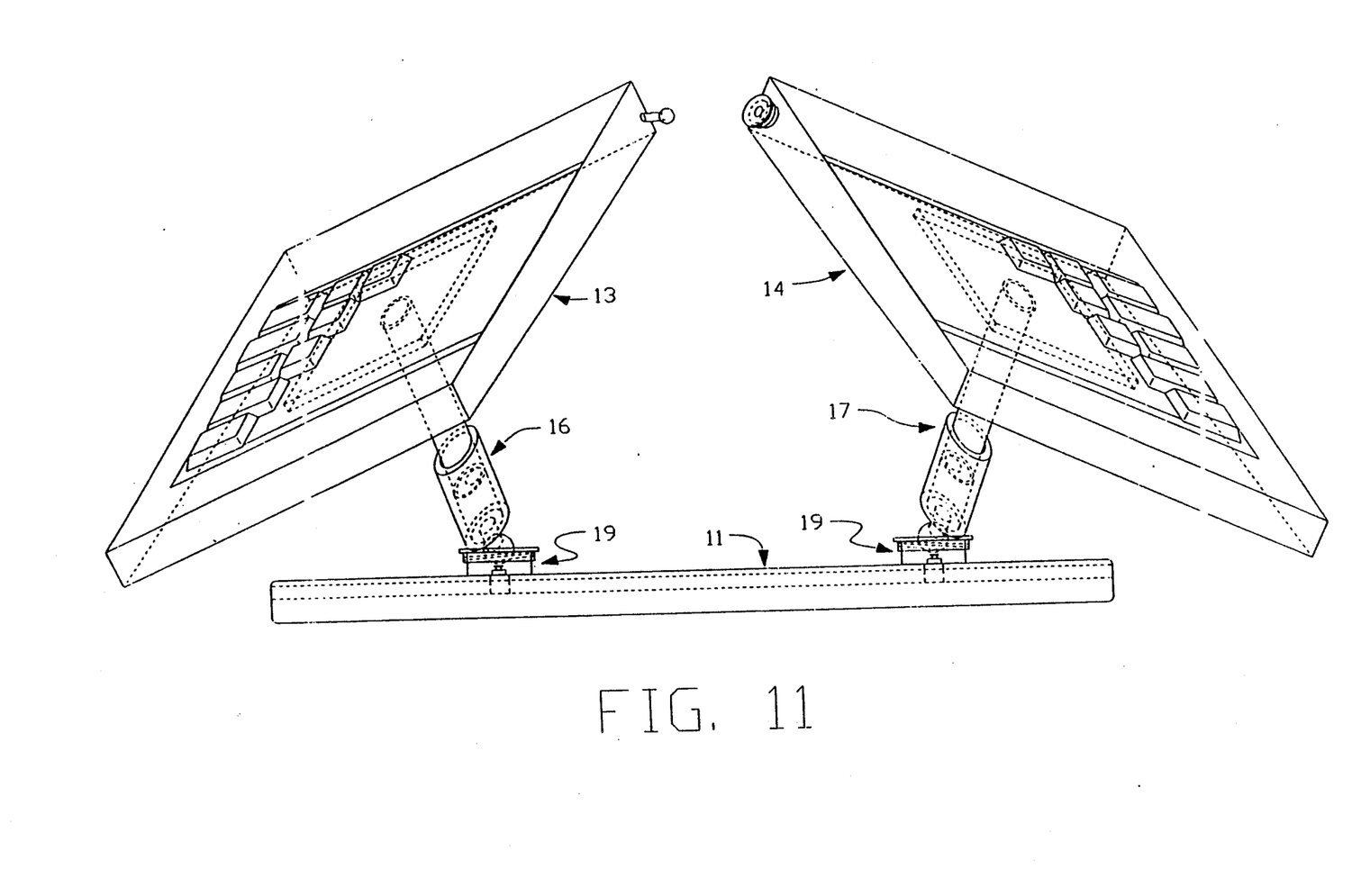
FIG. 11 is a front view illustrating an alternate embodiment of the invention.

Computer work stations may be constructed with a cabinet having sections for storage of the several components shown in FIG. 1. In such cabinets, a standard section is provided for a standard flat keyboard unit. The illustrated embodiment shown in FIGS. 1–8 can be collapsed to a flat rectangular, as shown in FIGS. 9 and 10, for storage as a standard sized unit. Thus, posts structures 18 are vertically oriented with sections 13 and 14 in a common horizontal plane, as shown in FIG. 9. The pivot unit 21 can be opened by threading of cap 42 from the cup-shaped socket 40. The array sections 13 and 14 can then be separated to more accurately custom design the location of the sections for the user, as shown in FIG. 11. The keyboard unit may of course be constructed without the apex pivot unit 21.

Further, the completely individual and separated keyboards of FIG. 11 illustrate the applicable aspect of the present invention to single hand operated devices such as adding machines, hand held information input keyboard members and the like.

The adjustable positioned keyboard unit may be constructed with a generally closed V-shaped configuration having a central hinge structure shown as a conventional ball-type hinge structure secured to the underside of the top keyboard plate sections 28 and 29.

Computing devices are regularly used over relatively long periods from young grade school or from children in the primary school grades to the very elderly. The invention which permits the precise location of a standard keyboard can advantageously be used for the physically challenged individual because it will permit such individual to have the keys located in optimal position for adaptation to his unique physical requirement. The mobility and positioning of the hands and arms will thus have very significantly improved hand orientation not only with the age but with the size and positioning at the work stations.

The present invention is particularly adapted to production of the conventional keyboard with the modified improved hand orieintation. In addition, it only requires revision of the key section and could be applied in a reasonably cost effective manner to existing keyboard units by merely providing of the sections and appropriate interconnecting cable and structure to adapt the unit to existing electronic keyboards and the like.

Although illustrated in the multiple adjustable construction, any other suitable adjustable position construction system incorporating the appropriate organization and construction of the keyboard with a left and right inclination as illustrated, or such other arrangement particularly adapted to the improved positioning of the hand with respect to the arm, to prevent the conventional offset therebetween can be provided. Thus, for example, it may be found that for certain class of individuals the keyboard may not be divided precisely evenly but may have some slight offset with respect to the location of the apex of the V-shaped board. In addition, further modification to the shape of the keyboard themselves may be desirable to reorient the position of certain keys to minimize any required movement of the hand relative to the arm structure during the typing functions or inputting functions. The universal pivot units as well as the linear location of the separate sections however provides for maximum optimal location for any given keyboard operator. The assembly is releasably locked in place and permits subsequent adjustment to compensate for any improper original adjustment as well as complete resetting for other personnel.

Various modes of carrying out the invention are contemplated as being within the scope of the following claims particularly pointing out and distinctly claiming the subject matter which is regarded as the invention.

I claim:

1. A keyboard apparatus having a plurality of keys arranged in an array extending over an extended front-to-back and side-to-side of a keyboard support for dual hand operation by an operator, comprising a key support structure for supporting of said keys, said support structure defining a left array section having a first individual support unit secured generally centrally of the section and a right array section having a second individual support unit secured generally centrally of the right array section, each of said array sections including a plurality of individual keys, each of said array sections being a substantially planar member having the keys located in a substantially common plane, each of said support units including a universal support unit for inclined location of the section and for substantially complete rotation of the section in the plane of the section, said left array section located in a laterally inclined plane and having at least portion of said keys arranged in said inclined plane and thereby extending upwardly at a preselected angle from an outer left portion of the keyboard upwardly and inwardly toward said right array section, said right array section located in a laterally inclined plane having a least a portion of said keys located in said inclined plane extending from an outer right portion of said keyboard upwardly and inwardly toward the left array section whereby an operator operating said keyboard can operate the keys in said inclined planes with the hand located in essentially forward aligned projection from the operators arm portion to minimize bodily stress.

2. The apparatus of claim 1 wherein said left and right key array sections have all of the keys in each of the arrays located and supported in said inclined planes.

3. The apparatus of claim 1 wherein each of said support units includes an extendible support and said universal support unit includes a universal pivot unit for varying the location of the plane of said sections.

4. The apparatus of claim 3 wherein a universal support is connected to the top inner portions of said key supports to define an essentially inverted V-shaped keyboard unit.

5. The apparatus of claim 3 wherein said extendible support includes telescopic members connected by a releasable locking nut.

6. The apparatus of claim 3 including a linear adjustable mount unit connected to said individual support units for adjusting the spacing of said extendible supports and thereby said array sections.

7. A keyboard apparatus having a plurality of keys for inputting to a processing unit, comprising a bottom support structure, an upper keyboard plate enclosure unit including said keys located in a substantially common plane, a universal pivot support unit establishing essentially unrestricted rotation of said enclosure unit in said plane for establishing unrestricted inclined orientation of said enclosure unit in space, said enclosure unit having an upper plate structure with a plurality of key positions arranged in a plurality of parallel rows extending from the left to the right side and a plurality of parallel columns extending from the front to the back of said plate structure, said plate structure including a left plate section, said sections a right plate section and extending laterally outwardly and downwardly from a central portion between said plate sections, each of said plate sections being a substantially planar member including a substantially flat plane, a plurality of keys secured to each plate section and located in said key positions for manual manipulation by an operator and locating of said keys in an inclined plane essentially identical to the plane of said corresponding plate section to which the keys are secured, said keyboard plate structure being inclined from the front to the back and thereby providing a dual inclination of said array of keys and permitting the operator to operate the keyboard with the hands projecting essentially in fixed straight line relationship to the wrist and arm of the operator.

8. The apparatus of claim 7 wherein said universal pivot support unit includes separate universal pivot members connected one each to each of said left and right plate sections, a releasable universal pivot device connected to said plate sections at the top and inner edge thereof to permit placing said plate sections in the form of a V-shaped keyboard configuration with relative adjustment of the depth of the V-shaped keyboard configuration, an adjustable means coupled to said left and right keyboard plate sections and simultaneously adjusting the position of said keyboard plate sections.

9. The apparatus of claim 8 having an adjustment unit providing for essentially continuous and infinite adjustment of the keyboard configuration between a first limit position and a second limit position.

10. The apparatus of claim 8 wherein said keyboard configuration has an apex at said releasable universal pivot device and said left and right keyboard plate sections are movably coupled to permit varying of the vertical orientation of said apex while maintaining the parallel and in line orientation of said keys, said keys having integrated switch units responsive to key touch by the operation, associated electronics within said enclosure unit for responding to actuation of said keys, a circuit connection means between said keys and said associated electronics to permit movement of said keys with said plate sections to maintain the planar orientation of the keys without interference with the associated electronic circuitry.

11. An input keyboard consisting of a plurality of planar oriented keys in a cartesian coordinate of individual keys in parallel lateral rows and front-to-back columns in a substantially common plane, comprising first and second keyboard sections each having said keys arranged thereon in said cartesian coordinates, a first universal support connected to said first keyboard section generally centrally of said cartesian coordinates to permit free rotation of the keyboard section and a second universal support connected to said second keyboard section generally centrally of said cartesian coordinates to permit free rotation of the keyboard section, said first and second universal supports providing for angular orientation of each of said keyboard sections with lateral inclination as well as front-to-back inclination.

12. The apparatus of claim 11 wherein at least one of said universal supports includes a lateral linear support for lateral orientation of said keyboard sections with respect to each other.

13. The apparatus of claim 11 wherein said universal supports each includes a rotating axis for rotation of keyboard sections about a generally vertical axis, said keyboard sections being inclined front-to-back and having a top edge, whereby said keyboard sections can be oriented with a generally inverted V-shaped opening having an apex at the top edge of said keyboard sections.

* * * * *

UNITED STATES PATENT AND TRADEMARK OFFICE
CERTIFICATE OF CORRECTION

PATENT NO. : 5,067,834
DATED : November 26, 1991
INVENTOR(S) : JEFFREY P. SZMANDA ET AL It is certified that error appears in the above-identified patent and that said Letters Patent is hereby corrected as shown below:

Column 7, line 46, CLAIM 1, delete "a" and substitute therefor ---at---; Column 8, Line 18, CLAIM 7, delete "said sections" and substitute therefor ---and---; Column 8, Line 18, CLAIM 7, after "section" (second occurence) delete "and" and substitute therefor ---, said sections---; Column 10, Line 5, CLAIM 13, after "of" insert ---said---.

Signed and Sealed this

Fifteenth Day of June, 1993

Attest:

MICHAEL K. KIRK

Attesting Officer

Acting Commissioner of Patents and Trademarks